(12) United States Patent
Heron et al.

(10) Patent No.: US 9,124,485 B2
(45) Date of Patent: Sep. 1, 2015

(54) TOPOLOGY AWARE PROVISIONING IN A SOFTWARE-DEFINED NETWORKING ENVIRONMENT

(71) Applicant: CISCO TECHNOLOGY, INC., San Jose, CA (US)

(72) Inventors: Giles D.Y. Heron, Hampstead (GB); Andrew James McLachlan, London (GB); Peter Weinberger, Wallisellen (CH); Maciej Konstantynowicz, Bucks (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 131 days.

(21) Appl. No.: 13/970,057

(22) Filed: Aug. 19, 2013

(65) Prior Publication Data

US 2015/0049631 A1 Feb. 19, 2015

(51) Int. Cl.
*H04L 12/751* (2013.01)
*H04L 12/715* (2013.01)

(52) U.S. Cl.
CPC ............... *H04L 45/02* (2013.01); *H04L 45/64* (2013.01)

(58) Field of Classification Search
CPC .......... H04Q 1/00; H04L 41/12; H04L 45/02; H04L 45/00; H04L 45/04; H04L 41/04; H04L 12/18; H04L 12/185; H04L 45/16; H04L 49/201; H04L 29/0653; H04L 29/06095; H04L 49/3009; H04L 45/74
USPC .......................................... 370/254, 392, 390
See application file for complete search history.

(56) References Cited

U.S. PATENT DOCUMENTS

| 7,769,037 | B2* | 8/2010 | Booth et al. ................... 370/419 |
| 8,711,855 | B1* | 4/2014 | Murphy et al. ................ 370/390 |
| 2002/0178252 | A1 | 11/2002 | Balabhadrapatruni et al. |
| 2006/0245439 | A1* | 11/2006 | Sajassi .......................... 370/400 |
| 2008/0117902 | A1 | 5/2008 | Vinneras |
| 2010/0226490 | A1* | 9/2010 | Schultz et al. ........... 379/265.09 |

* cited by examiner

Primary Examiner — Dady Chery
(74) Attorney, Agent, or Firm — Patent Capital Group

(57) ABSTRACT

An example method for topology aware provisioning in a software-defined network environment is provided and includes receiving, at a provider edge device (PE), access network topology information associated with a customer edge device in a network environment, synthesizing the access network topology information and a local router information associated with the PE into a topology message, and publishing the topology message to a central controller in the network environment. The synthesizing can include aggregating the access network topology information and the local router information, modeling the aggregated information in a representation-independent format and encoding the representation-independent formatted aggregated information in standardized machine-parsable format.

20 Claims, 12 Drawing Sheets

TOPOLOGY AWARE PROVISIONING IN A SOFTWARE-DEFINED NETWORKING ENVIRONMENT

TECHNICAL FIELD

This disclosure relates in general to the field of communications and, more particularly, to topology aware provisioning in a software-defined networking (SDN) environment.

BACKGROUND

As elastic cloud architectures and dynamic resource allocation evolve and as usage of mobile computer operating systems and virtual machines grows, Software-Defined Networking (SDN) has gained increasing relevance in networking systems. SDN is an approach to building computer networking equipment and software that separates and abstracts the control plane and data plane of networking systems. SDN decouples the control plane that makes decisions about where traffic is sent from the underlying data plane that forwards traffic to the selected destination. SDN allows network administrators to manage network services through abstraction of lower level functionality into virtual services through a central controller. Such a control layer allows network operators to specify network services without coupling the specifications with network interfaces, enabling network nodes to move between interfaces without changing identities or violating specifications.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for topology aware provisioning in a software-defined network environment is provided and includes receiving, at a provider edge device (PE), access network topology information associated with a customer edge device (CE) in a network environment, synthesizing the access network topology information and a local router information associated with the PE into a topology message, and publishing the topology message to a central controller in the network environment. The synthesizing can include aggregating the access network topology information and the local router information, modeling the aggregated information in a representation-independent format and encoding the representation-independent formatted aggregated information in standardized machine-parsable format.

Example Embodiments

Figure 1:
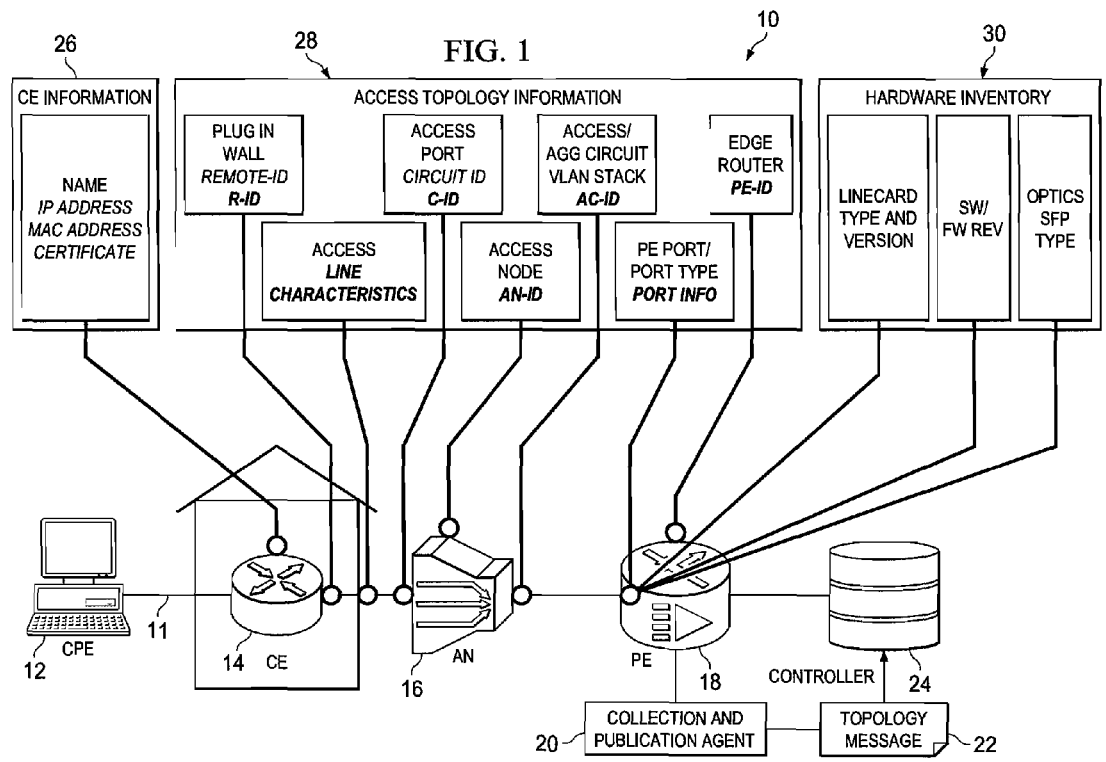
FIG. 1 is a simplified block diagram illustrating a communication system to facilitate topology aware provisioning in a software-defined networking environment according to an example embodiment.

Turning to FIG. 1, FIG. 1 is a simplified block diagram illustrating an embodiment of communication system 10 for facilitating network-assisted configuration and programming of gateways in a network environment. Communication system 10 includes a network 11 connecting a customer premises equipment (CPE) 12 with a customer edge device (CE) 14, which connects to an access node (AN) 16 that communicates with a provider edge device (PE) 18. PE 18 may be provisioned with a collection and publication agent 20 configured to send one or more topology message 22 to a central SDN controller 24.

According to various embodiments, PE 18 may receive access network topology information associated with CE 14. The access network topology information may include CE info 26, which comprises information about CE 14, such as device name, Internet Protocol (IP) address, Media Access Control (MAC) address, certificate, etc. The access network topology information may include access topology information 28, for example, plug in wall/remote identifier (ID) (R-ID), access line characteristics, access port circuit ID (C-ID), access node (AN-ID), access/aggregation circuit virtual local area network (VLAN) stack (AC-ID), PE port/port type (Port Info), and edge router ID (PE-ID), among other parameters. PE 18 may also retrieve local router information, comprising hardware inventory 30, such as line-card type and version, software/firmware revision, transceiver type (e.g., small form factor pluggable (SFP) optical transceiver type), etc. PE 18 may aggregate the access topology information and local router information and synthesize topology message 22 to controller 24. Controller 24 may take various suitable network provisioning actions based on the information in topology message 22.

As used herein, the term "customer premises equipment" includes any device (e.g., computer, printer, fax machine, smart phone, laptop, etc.) logging into (e.g., communicating with, connecting to, accessing, etc.) network 11 using a customer's access credentials (e.g., subscription credentials, user name, password, etc.). The term "access node" includes a Layer 2 switch usually located at a service provider's central office or street cabinet that terminates access loop connections from subscribers. Examples of the access node include Digital Subscriber Line Access Multiplexer (DSLAM) in digital subscriber line (DSL) technology. The access node facilitates connection to an access network. The access network is a part of a telecommunications network that connects customers to their immediate Internet service provider (ISP). The access network may include a wide variety of networking technologies, for example, copper wires, DSL, cable mode, Integrated Services Digital Network (ISDN), Ethernet, Frame Relay, Asynchronous Transfer Mode (ATM), synchronous optical networking (SONET), etc. The access node aggregates the various and disparate network technologies into a single backhaul network technology (e.g., to facilitate connection to the core network, which is the central part of a telecommunication network that provides various services to customers who are connected by the access network).

The backhaul traffic terminates on the provider edge devices. The term "provider edge device" includes a Layer 3 router connected to the ISP's network infrastructure at which a link to the customer site is terminated. The terms Layer 2 and Layer 3, as used herein, refer to the data link layer and network layer, respectively, in the Open Systems Interconnection (OSI) model (ISO/IEC 7498-1) of communication networks. The PE can encapsulate IP traffic from the access node in Multiprotocol Label Switching (MPLS) tunnels for transmission over the ISP's MPLS backbone in the core network. The PE includes equipment capable of a broad range of routing protocols, such as Border Gateway Protocol (BGP), Open Shortest Path First (OSPF), and MPLS.

The term "customer edge device" includes a device that interfaces between a wide area network (e.g., access network) and local area network (e.g., subscriber's LAN) IP environment. Also sometimes called the residential gateway, it may route (e.g., router functionality) or bridge (e.g., switch functionality) traffic, depending on its configuration and specifications. In some embodiments, CPE 12 and CE 14, or the functionalities of CPE 12 and CE 14, may be, or may execute in, the same physical device. The term "SDN Controller" or "controller" includes a control application in SDN architecture that manages flow control to enable intelligent networking.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Service providers today generally provision their access and core networks separately and have different inventory systems for these networks, which are often inaccurate. When provisioning services, service providers generally configure the access network connectivity and the IP service configuration separately and then co-ordinate the two activities to tie them together (for example, the access team may tell the router team which port/VLAN the connectivity to a user site can be delivered over, and then the router team may apply the service configuration to the specified port/VLAN). In addition, it is a well known practice in service provider networks to perform re-homing of network elements (e.g., access nodes), which can be prone to human errors and can represent a challenge to network inventory bookkeeping (e.g., re-homing access nodes is a known source of network inventory inconsistencies).

To illustrate with an example, consider provisioning a 50 mbps E-line from an endpoint A (e.g., CE) to another endpoint Z in a geographically disparate location through various networks, such as a customer premises networks, access networks, and a core network, each network including one or more network elements. As used herein, the term 'network element' is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

The service provider's network may identify remote endpoints A and Z with their remote IDs. Each endpoint A and Z, which represents respective CEs, may be connected to their corresponding metro networks using fiber optics or other suitable communication medium. The metro networks may include numerous L2 switches interconnected in a ring topology, and connected to the core network via respective PE routers. PE routers at two ends of the core network may be connected over a MPLS cloud.

To provision the 50 mbps line from endpoint A to endpoint Z requires knowledge of the various parameters (e.g., identities, capabilities, connectivity, etc.) of network elements connecting the two endpoints over the disparate networks. Because each of the networks may be part of separate domains (e.g., controlled by different entities), information about network elements, network connectivity, or access topology, which can include information external to each domain, may be difficult to obtain in an accurate and timely manner. For example, configuration within each of the networks may change (e.g., due to re-homing access nodes, adding or removing nodes, etc.). The service provider controlling one of the domains may store network topology information inventory off-line, in a suitable database; however, such configuration changes external to the service provider's domain may not be updated appropriately and may lead to network provisioning errors, or inventory inconsistencies.

In many networks, Remote Authentication Dial In User Service (RADIUS) protocol may be used to provide centralized Authentication, Authorization, and Accounting (AAA) management for computers to connect and use a network service. RADIUS serves at least three functions: to authenticate users or devices before granting them access to a network; to authorize those users or devices for certain network services; and to account for usage of those services. Typically, a user (e.g., CE) sends a request to a Remote Access Server (RAS) to gain access to a particular network resource (e.g., service node in a service provider's network) using access credentials (e.g., username, password, security certificate, etc.). The access credentials are passed to the RAS via a link-layer protocol (e.g., Point-to-Point Protocol (PPP)). In turn, the RAS sends a RADIUS Access Request message to a RADIUS server, requesting authorization to grant access via the RADIUS protocol. The request from the RAS to the RADIUS server includes the access credentials provided by the user. Additionally, the request may contain other information, which the RAS knows about the user, such as its network address, and information (such as Remote ID and Circuit ID) regarding the user's physical point of attachment to the RAS.

The RADIUS server checks the accuracy and authenticity of the access credentials and other information using various authentication schemes. Access privileges and other such information may be stored locally on the RADIUS server, or may be looked up in an external source such as LDAP or Active Directory. The RADIUS server returns one of three responses to the RAS: 1) Access Reject (e.g., user is unconditionally denied access to all requested network resources, for example, because of failure to provide proper proof of identification); 2) Access Challenge (e.g., requesting additional information from the user such as a secondary password, PIN, token, or card, etc.); or 3) Access Accept (e.g., the user is granted access).

However, the RADIUS protocol has a few drawbacks. First, RADIUS requires that the user's equipment support the specific layer 2 protocols (e.g., PPPoE, EAP, DHCP, etc.). Second, RADIUS based models produce ephemeral configurations. For example, if the RAS re-boots, the RADIUS server would have to be re-queried to bring the service back up for the user. Due to the request-response model, recovery time may also be high. Third, RADIUS is not suitable for expressing complex and idiosyncratic policies. The RADIUS protocol performance can be a bottleneck in some network scenarios. Moreover, there is no precedent for pervasive business services based in RADIUS. Further, RADIUS based models assume obsolete dial-in behavior, whereas service providers are increasingly moving towards a flat-rate static model closer to that of a traditional "leased line" business service.

Communication system 10 is configured to address these issues (and others) in offering a system and method for topology aware provisioning in a SDN environment. Embodiments of communication system 10 can enable service providers to link access and IP provisioning, and to use the network as a master source of inventory, reducing effort to provision new services; and reducing outages and re-work caused by multiple inaccurate inventories.

According to various embodiments, PE 18 may receive access network topology information associated with CE 14. Some access network topology information (e.g., CE info 26) may be learnt from CE 14; some other access network topology information (e.g., access topology information 28 such as remote ID, access line characteristics, circuit ID) may be learnt from the network links between CE 14 and AN 16; yet other access network topology information (e.g., access topology information 28 such as access node ID, and VLAN stack) may be learnt from AN 16; and some other access network topology information (e.g., access topology information 28 such as PE port info and PE ID) may be learnt from PE 18 itself.

Collection and publication agent 20 coupled to PE 18 may synthesize the CE information, access network topology information, and local router information associated with PE 18 into topology message 22 and publish (e.g., communicate, send, forward) topology message 22 to controller 24. The synthesizing can include aggregating the access network topology information and the local router information, modeling the aggregated information in a representation-independent format and encoding the representation-independent formatted aggregated information in standardized machine-parsable format.

In one example embodiment, the access network topology information may be received according to an AN protocol (e.g., Access Node Control Protocol (ANCP)) from AN 16. The AN protocol may run out-of-band to user traffic and identify the Circuit ID, the Remote ID of CE 14 and a VLAN stack (among other access network topology parameters) over which user traffic can be communicated with AN 16.

In another example embodiment, the access network topology information may be received according to a CPE protocol (e.g., Extensible Messaging and Presence Protocol (XMPP)) from CPE 12 (or CE 14, if CE 14 has the requisite capabilities). For example, the CPE protocol may carry CE info 26. The CPE protocol may run in-band with user traffic mapped to a port and a VLAN at PE 18. CPE 12 may identify itself to PE 18 and CPE 12 may be trusted by PE 18 to do so. In some embodiments, the CPE protocol may be intercepted and modified by AN 16 to include addition of at least the Circuit ID and the Remote ID. An example of the modified CPE protocol is Dynamic Host Configuration Protocol (DHCP).

In yet another example embodiment, the access network topology information may be received at PE 18 according to a CPE user datagram based protocol in a First-Sign-Of-Life (FSoL) packet. PE 18 may be configured to listen for FSoL packets. PE 18 may be pre-configured with sufficient information to identify CE 14 in some embodiments. In other embodiments, PE 18 may previously learn identifying information about CE 14 from AN 16 (or other network elements), for example, through ANCP, DHCP, etc. For example, ANCP may be used to detect initial connection of a site to the network, and FSoL may be used to identify various service instances carried over that connection using different VLAN IDs. In yet another example embodiment, the access network topology information may be received at PE 18 from a port up event on PE 18. For example, CE 14 may be directly connected to PE 18.

After controller 24 has learned the access network topology from topology message 22, controller 24 may match the topology data with previously configured, or learned, information about a service instance to be provisioned. For example a service may be identified in controller 24 using the Remote ID. When controller 24 learns that a customer has attached to network 11 at a point corresponding to the Remote ID, controller 24 may then provision the service at PE 18 identified in topology message 22. If PE 18 learns that a customer connection to AN 16 has gone down, PE 18 may publish the information to controller 24, along with the service ID, if known. Controller 24 may then take appropriate action (e.g., choose to de-provision the service). If a change in topology between CE 14 and PE 18 is learnt at PE 18, such change can be appropriately published to controller 24 in topology message 22. In some cases (e.g. Remote ID to Circuit ID mapping changing) PE 18 may not learn of the change (e.g., as Remote ID and Circuit ID are generally statically configured at AN 16). If the service is still provisioned against the old access network topology, then it may first be de-provisioned before it can be re-provisioned against the updated access network topology.

Turning to the infrastructure of communication system 10, the network topology can include any number of servers, service nodes, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Communication system 10 can include any number of servers, service nodes, virtual machines, gateways (and other network elements) within the broad scope of the embodiments.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In some embodiments, collection and publication agent 20 can include an application executing in, at, or with, PE 18. In other embodiments, collection and publication agent 20 can include an application executing on another network element in communication with PE 18 and controller 24. In some embodiments, collection and publication agent 20 may be implemented in a separate stand-alone box that can be plugged into, or otherwise connected to, PE 18 and controller 24. In some embodiments, collection and publication agent 20 may be implemented in hardware, in software, or in a combination of hardware and software.

In some embodiments, controller 24 can be configured according to SDN architecture. In the SDN architecture, the control and data planes are decoupled, network intelligence and state are logically centralized in controller 24, and the underlying network infrastructure is abstracted from the applications. An example implementation of controller 24 includes Cisco® ONE controller. Controller 24 may be virtualized and centralized in network 11, enabling it to manage and control substantially all flows in network 11. Proprietary and/or open source software may be executed in network 11 to enable controller 24 to perform its operations.

Note that the access network topology information examples (e.g., CE 26, access topology information 28) and local router information (e.g., hardware inventory 30) presented in the FIGURE are merely examples, and are not intended to be limitations. Virtually any number and type of network and device related information may be included in topology message 22 sufficient to enable controller 24 to make provisioning decisions within the broad scope of the embodiments.

Figure 2:
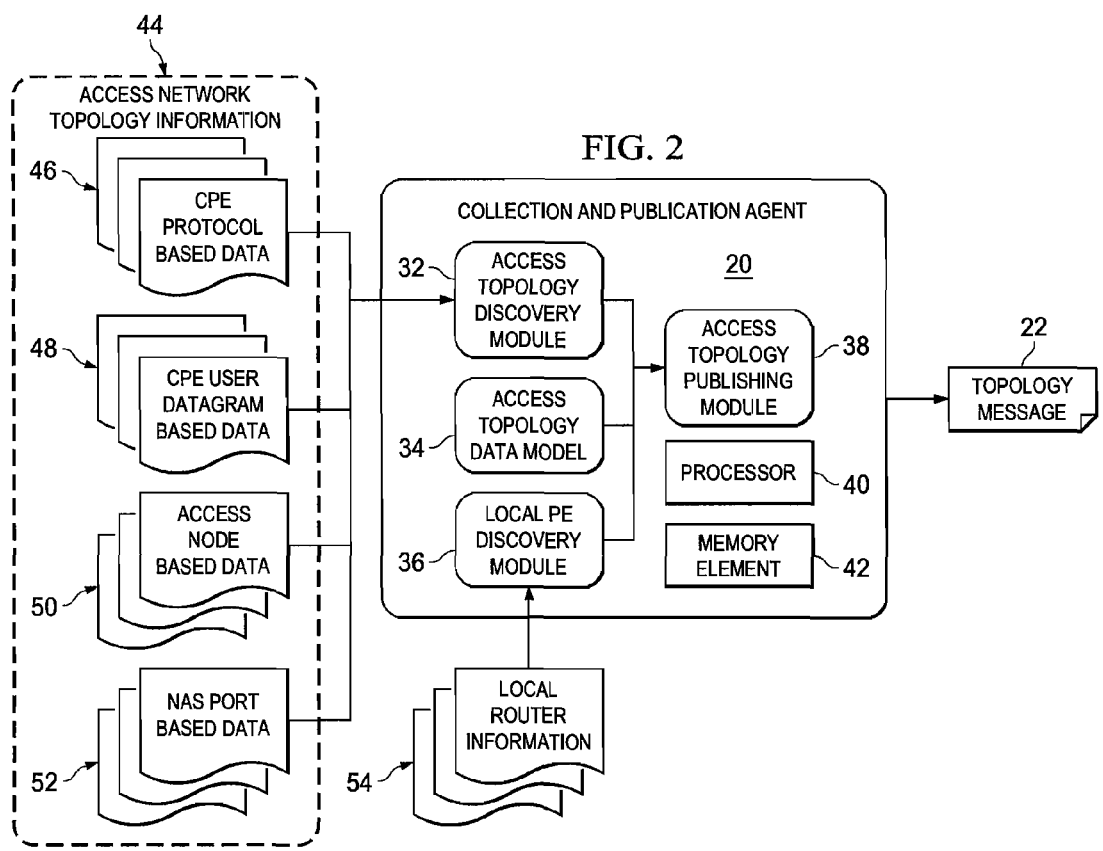
FIG. 2 is a simplified block diagram illustrating example details of the communication system in accordance with one embodiment.

Turning to FIG. 2, FIG. 2 is a simplified block diagram illustrating example details of an embodiment of communication system 10. Collection and publication agent 20 can include an access topology discovery module 32, an access topology data model 34, a local PE discovery module 36, an access topology publishing module 38, a processor 40 and a memory element 42. Access network topology information 44 may be received at access topology discovery module. Access network topology information 44 may include, merely as examples, and not as limitations, CPE protocol based data 46, CPE user datagram based data 48, access node based data 50, and PE port based data 52 (among other possible data). CPE protocol based data 46 may be communicated over CPE protocols (e.g., DHCP); CPE user datagram based data 48 may include FSoL packets; access node based data 50 may be communicated over ANCP protocols; and PE port based data 52 may be received on appropriate PE ports.

Access topology data model 34 includes mechanisms (e.g., data modeling language such as YANG) for representing access network topology information 44 in a suitable representation-independent format (e.g., that decouples the link between data representation and patterns that can be applied to an object, thus providing greater flexibility on creating/deconstructing objects; with relational independence, clients of an abstract type behave uniformly across all relational interpretations of that type and thus cannot depend in any way on how the type is represented) and standardized machine-parsable format (e.g., capable of being read by a computer). For example, YANG is a data modeling language that can be used to model configuration data and state data of network elements. YANG can be also used to define the format of event notifications emitted by network elements. YANG can represent data structures in an XML tree format.

Local PE discovery module 36 may receive local router information 54 from PE 18. Local router information 54 may include information related to the hardware, software and firmware configurations of PE 18. Access topology publishing module 38 may synthesize access network topology information 44 and local router information 54 into topology message 22. Synthesizing may include aggregating access network topology information 44 and local router information 54, formatting the aggregated information into representation-independent format, and encoding in standardized machine-parsable format. For example, CE 14 may be connected to PE1 on port 1, VLAN 101 over AN1 and Remote-ID rem1, Circuit-ID ckt1. Topology message 22 may include the relevant information including {rmt1, ckt1, AN1, port 1, VLAN 101 and PE1} associated with CE 14, sufficient to permit controller 24 to take provisioning decisions appropriately.

Processor 40 and memory element 42 may be used for the operations described herein. In some of example embodiments, one or more memory elements (e.g., memory element 42) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 40) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The devices in communication system 10 may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Figure 3:
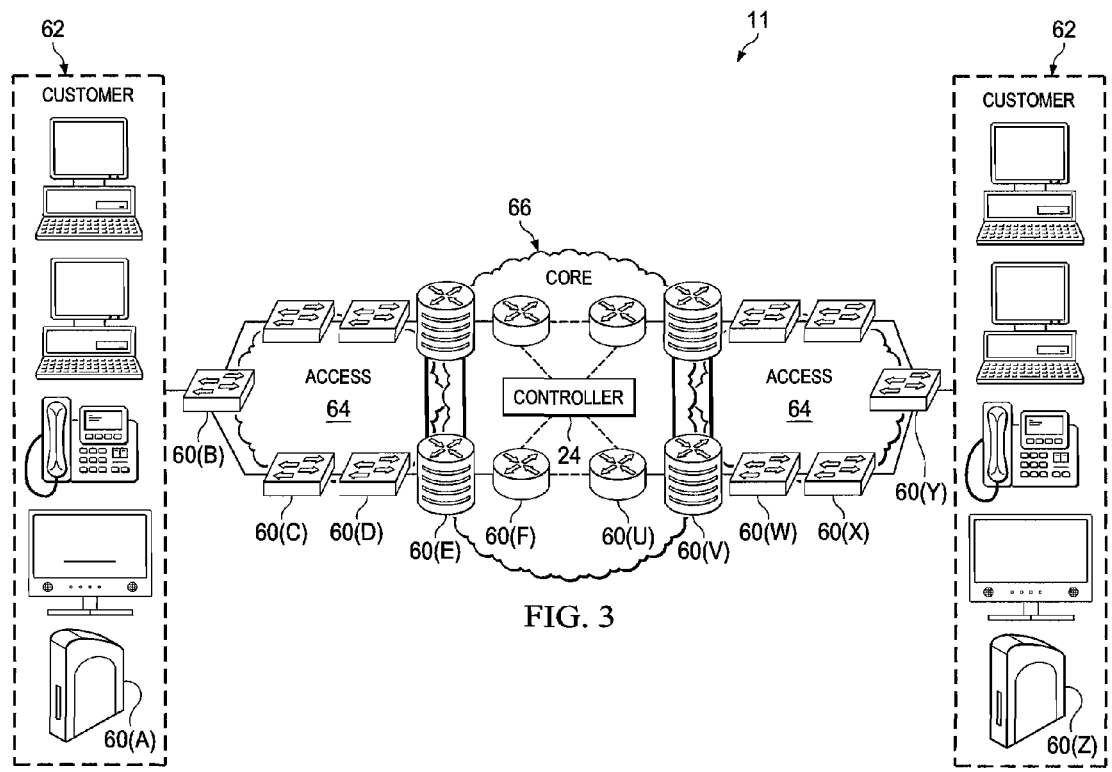
FIG. 3 is a simplified block diagram illustrating other example details of the communication system in accordance with one embodiment.

Turning to FIG. 3, FIG. 3 is a simplified block diagram illustrating example details of an embodiment of communication system 10. Network 11 includes various nodes 60(A)-60(Z). For example, nodes 60(A) and 60(Z) may represent two endpoint CEs located in one or more customer network 62. Nodes 60(B) and 60(Y) may represent L2 switches connecting customer network 62 to one or more access network 64. L2 switch nodes 60(B) and 60(Y) may be coupled in a ring topology in access network 64 with other L2 switch nodes 60(C), 60(D) and 60(X), 60(W) and connected to PE router nodes 60(E) and 60(V) that may communicate over a core network 66 via routers 60(F) and 60(U). According to an embodiment of communication system 10, PE router nodes 60(E) and 60(V) may communicate with a central controller 24 in core network 66 to provision a 50 mbps line (or any other appropriate service) between nodes 60(A) and 60(Z).

To provide the appropriate services to nodes 60(A) and 60(Z), knowledge of the nodes interconnecting the two endpoints may be needed. If the network topology and/or connectivity between nodes 60(A) and 60(Z) changes, service provisioning may need to change appropriately. One of the big challenges network access providers have is that topology and/or architecture of access networks 64 may tend to move around a lot (e.g., subscribers may be re-homed and end up connecting to different edge networks). PE router nodes 60(E) and 60(V) may publish access network topology information to controller 24 each time a subscriber connects (or reconnects) to network 11. At PE nodes 60(E) and 60(V), access network topology information may be learnt in many suitable ways. Such access network topology information may be bundled up (e.g., aggregated) and published to controller 24 in suitable topology message 22.

Figure 4:
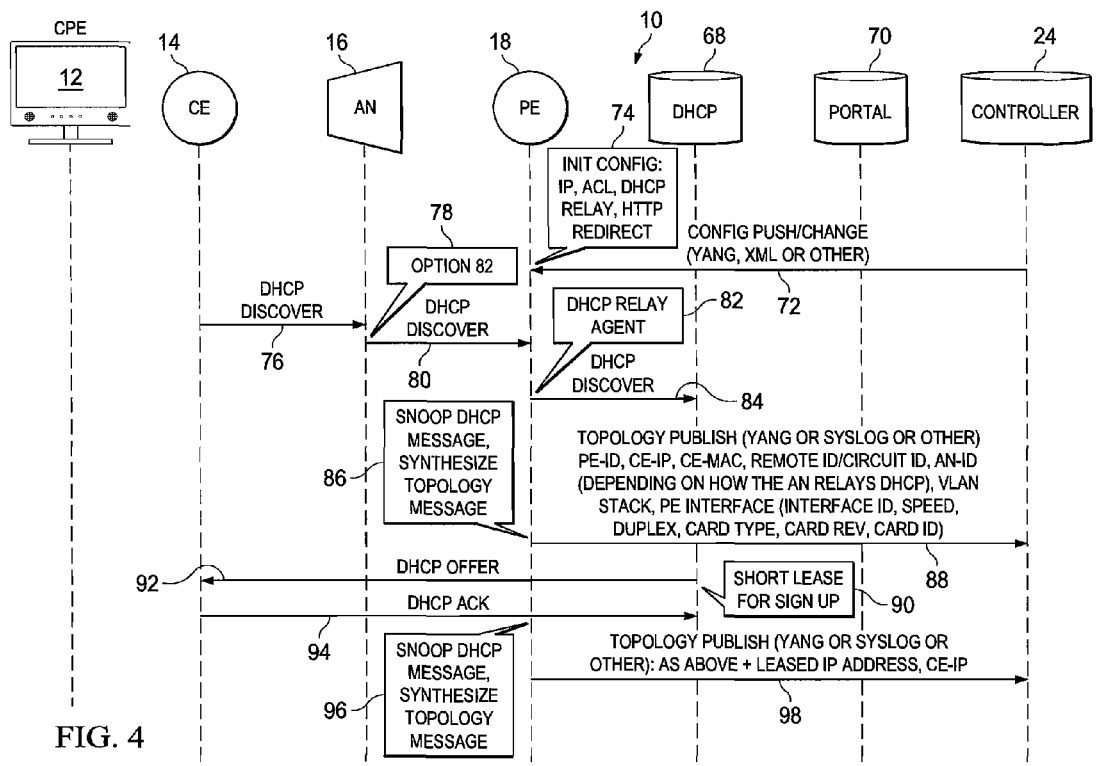
FIG. 4 is a simplified sequence diagram illustrating yet other example details of the communication system in accordance with one embodiment.

Turning to FIG. 4, FIG. 4 is a simplified sequence diagram illustrating example details and potential operations of an embodiment of communication system 10 associated with call flow user sign up and provisioning. Communication system 10 can include, in addition to CPE 12, CE 14, AN 16, PE 18 and Controller 24, a DHCP server 68 and a portal 70. At 72, controller 24 may push configurations on PE 18 using appropriate Yang data model, XML, or other suitable mechanisms. At 74, PE 18 may be initially configured with an IP address, access control lists (ACLs), DHCP relay, hyper text transfer protocol (HTTP) redirect, etc. At 76, a DHCP discover message may be sent by CE 14 and intercepted by AN 16. At 78, AN 16 may relay the DHCP discover message, enhancing it with CE 14's point of attachment using DHCP option 82. (Option 82 provides information about the network location of a DHCP client (e.g., CE 14) in the form of a Remote ID and Circuit ID, and the DHCP server uses this information to assign IP addresses or other parameters for the client.). AN 16 sends the modified DHCP discover message at 80.

At 82, a DHCP relay agent at PE 18 may receive the DHCP discover message relayed by AN 16. At 84, the DHCP discover message may be forwarded to DHCP server 68. At 86, collection and publication agent 20 at PE 18 may snoop (e.g., inspect, review, etc.) the DHCP discover message from AN 16 and synthesize topology message 22. At 88, PE 18 may publish topology message 22 to controller 24. Topology message 22 may include, by way of examples and not limitations, PE-ID, CE-MAC, Remote ID/Circuit ID, AN-ID (depending on how the AN relays DHCP), VLAN Stack, and PE Interface (e.g., Interface ID, Speed, Duplex, Card Type, Card Rev, Card ID).

At 90, DHCP server 68 may assign an IP address to the DHCP client with a short lease for use during sign-up. At 92, the DHCP offer may be sent to CE 14 by DHCP server 68. At 94, a DHCP acknowledgement (ACK) message may be returned by CE 14 to DHCP server 68. At 96, collection and publication agent 20 at PE 18 may snoop the DHCP ACK message and synthesize another topology message 22. At 98, the another topology message 22 may be sent to controller 24. The another topology message 22 may include the leased IP address (CE-IP), in addition to other parameters. This IP address may subsequently be used by the controller 24 to correlate another topology message 22 to a new user logging into network 11.

Figure 5:
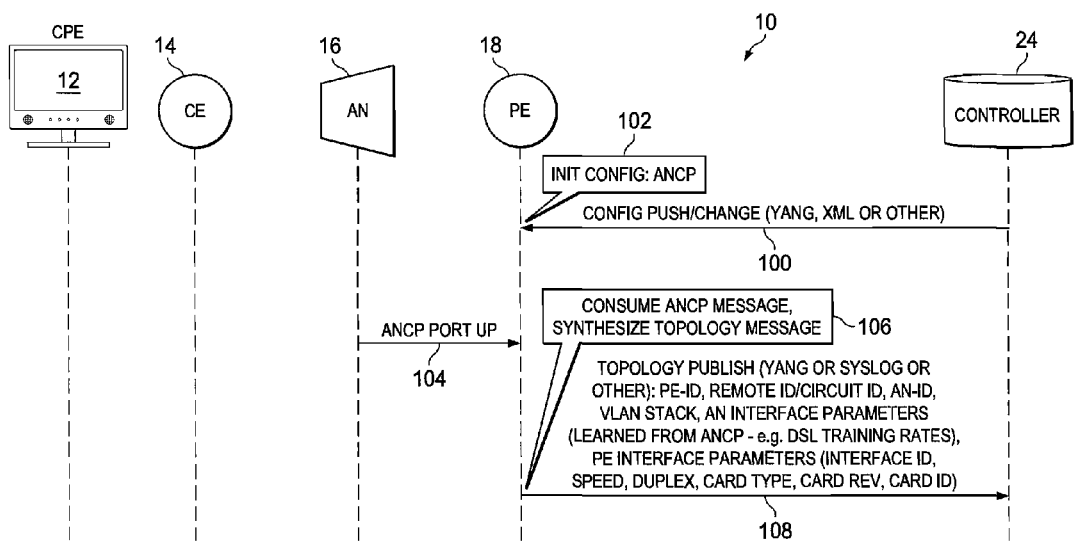
FIG. 5 is a simplified sequence diagram illustrating yet other example details of the communication system in accordance with one embodiment.

Turning to FIG. 5, FIG. 5 is a simplified sequence diagram illustrating example details and potential operations of an embodiment of communication system 10 associated with call flow provisioning for VLAN User Network Interface (UNI). Communication system 10 can include CPE 12, CE 14, AN 16, PE 18 and Controller 24. At 100, controller 24 may push configurations on PE 18 using appropriate Yang data model, XML, or other suitable mechanisms. At 102, PE 18 may be initially configured with ANCP parameters, for example, specifying each ANCP neighboring access node to be monitored, adjacency timer, restart timer, etc. At 104, notification of an ANCP port up at AN 16 may be received at PE 18. At 106, collection and publication agent 20 at PE 18 may consume ANCP message, and synthesize appropriate topology message 22. At 108, PE 18 may publish topology message 22 to controller 24. Topology message 22 may include, by way of examples and not limitations, PE-ID, Remote ID/Circuit ID, AN-ID, VLAN Stack, AN Interface Parameters (e.g., learned from ANCP, such as DSL training rates), and PE Interface parameters (e.g., Interface ID, Speed, Duplex, Card Type, Card Rev, Card ID).

Figure 6:
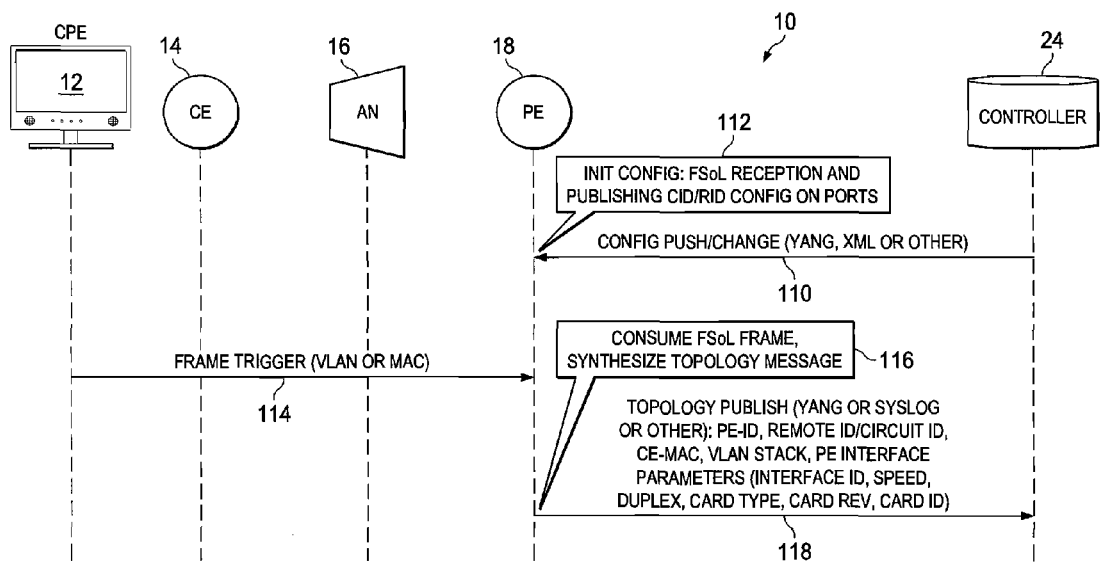
FIG. 6 is a simplified sequence diagram illustrating yet other example details of the communication system in accordance with one embodiment.

Turning to FIG. 6, FIG. 6 is a simplified sequence diagram illustrating example details and potential operations of another embodiment of communication system 10 associated with call flow provisioning for VLAN UNI. Communication system 10 can include CPE 12, CE 14, AN 16, PE 18 and Controller 24. At 110, controller 24 may push configurations on PE 18 using appropriate Yang data model, XML, or other suitable mechanisms. At 112, PE 18 may be initially configured to receive first-sign-of-life (FSoL) packets on appropriately configured (e.g., CID/RID) ports. (Dynamic Ethernet sessions are transient in nature, that is, they support start and end events. The start event is marked by the receipt of a frame of interest, which is called the FSoL. The end event is triggered by the expiry of a session idle timer. The FSoL trigger causes a chain of events that starts with subscriber authentication and authorization, followed by service and features determination according to policy rules, leading to dynamic session provisioning and feature or service enablement.)

At 114, a frame trigger (VLAN or MAC) (e.g., frame of interest) may be received from CE 14 at PE 18. At 116, collection and publication agent 20 at PE 18 may consume the FSoL frame, and synthesize appropriate topology message 22. At 118, PE 18 may publish topology message 22 to controller 24. Topology message 22 may include, by way of examples and not limitations, PE-ID, Remote ID/Circuit ID, CE-MAC, VLAN Stack, and PE Interface parameters (e.g., Interface ID, Speed, Duplex, Card Type, Card Rev, Card ID).

Figure 7:
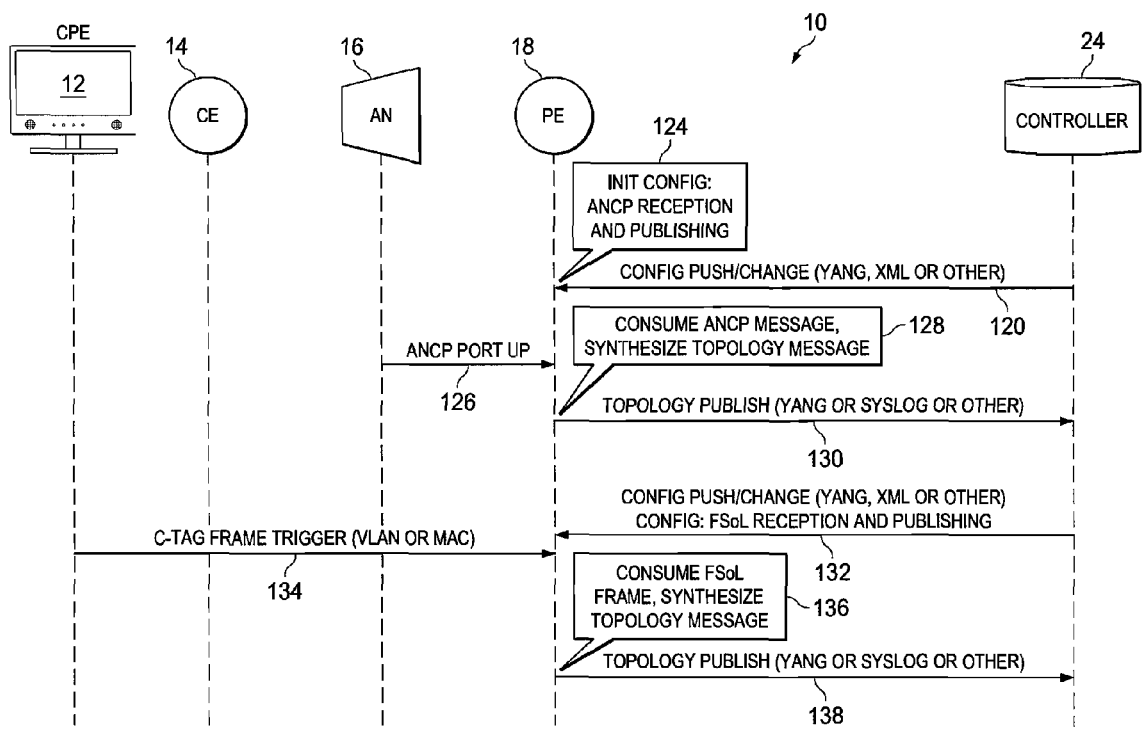
FIG. 7 is a simplified sequence diagram illustrating yet other example details of the communication system in accordance with one embodiment.

Turning to FIG. 7, FIG. 7 is a simplified sequence diagram illustrating example details and potential operations of another embodiment of communication system 10 associated with call flow provisioning for bundle VLAN UNI, for example, when services are delivered at PE 18 on double tagged VLAN with a customer tag (C-TAG) on CE 14. Communication system 10 can include CPE 12, CE 14, AN 16, PE 18 and Controller 24. At 120, controller 24 may push configurations on PE 18 using appropriate Yang data model, XML, or other suitable mechanisms. At 122, PE 18 may be initially configured for receiving ANCP packets. At 126, PE 18 may receive notification from AN 16 that an ANCP port is up. At 128, collection and publication agent 20 at PE 18 may consume the ANCP message, and synthesize appropriate topology message 22. At 130, PE 18 may publish topology message 22 to controller 24. At 132, controller 24 may push configuration for receiving FSoL frames to PE 18. At 134, PE 18 may receive a C-TAG Frame Trigger (VLAN or MAC). At 136, collection and publication agent 20 at PE 18 may consume the FSoL frame, and synthesize another appropriate topology message 22. At 128, PE 18 may publish topology message 22 to controller 24.

Figure 8:
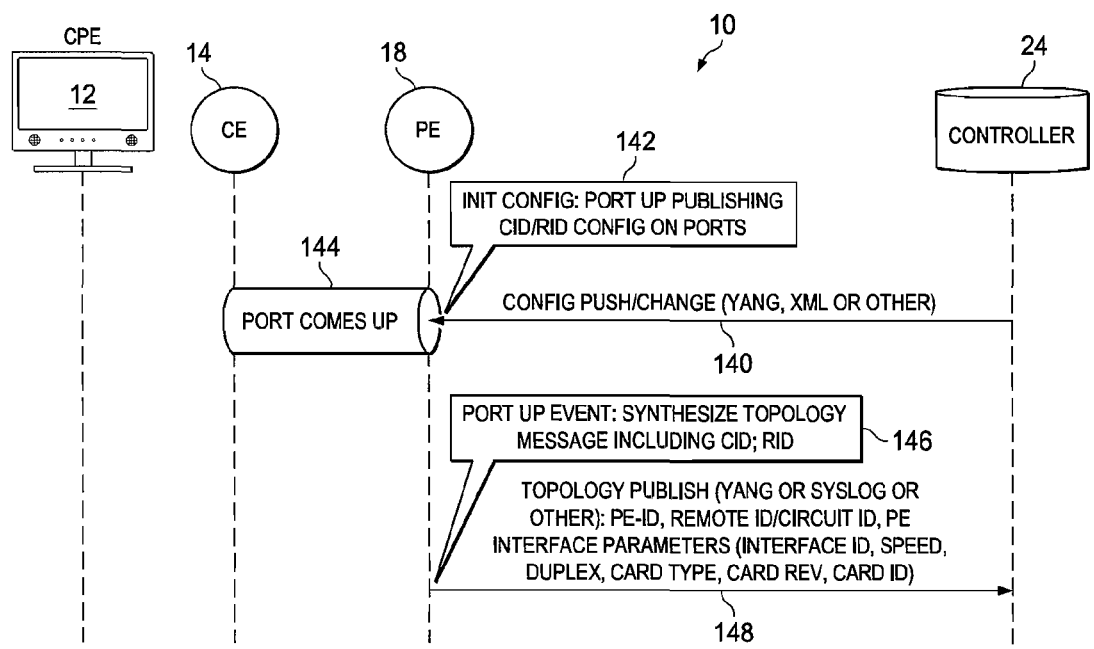
FIG. 8 is a simplified sequence diagram illustrating yet other example details of the communication system in accordance with one embodiment.

Turning to FIG. 8, FIG. 8 is a simplified sequence diagram illustrating example details and potential operations of another embodiment of communication system 10 associated with call flow provisioning for port UNI. PE 18 may offer services on a physical port, to which CE 14 may be directly connected. Communication system 10 can include CPE 12, CE 14, PE 18 and Controller 24. At 140, controller 24 may push configurations on PE 18 using appropriate Yang data model, XML, or other suitable mechanisms. At 142, PE 18 may be initially configured for port up publishing, and CID/RID may be configured on appropriate ports. At 144, a port connected to CE 14 may come up (e.g., turn on, light up, port ready to receive data, etc.). At 146, collection and publication agent 20 at PE 18 may receive notification of the port up event (e.g., through appropriate sensors, circuit, modules, etc.), and synthesize appropriate topology message 22, including CID, RID, etc. At 148, PE 18 may publish topology message 22 to controller 24. Topology message 22 may include, by way of examples and not limitations, PE-ID, Remote ID/Circuit ID, and PE Interface parameters (e.g., Interface ID, Speed, Duplex, Card Type, Card Rev, Card ID).

Figure 9:
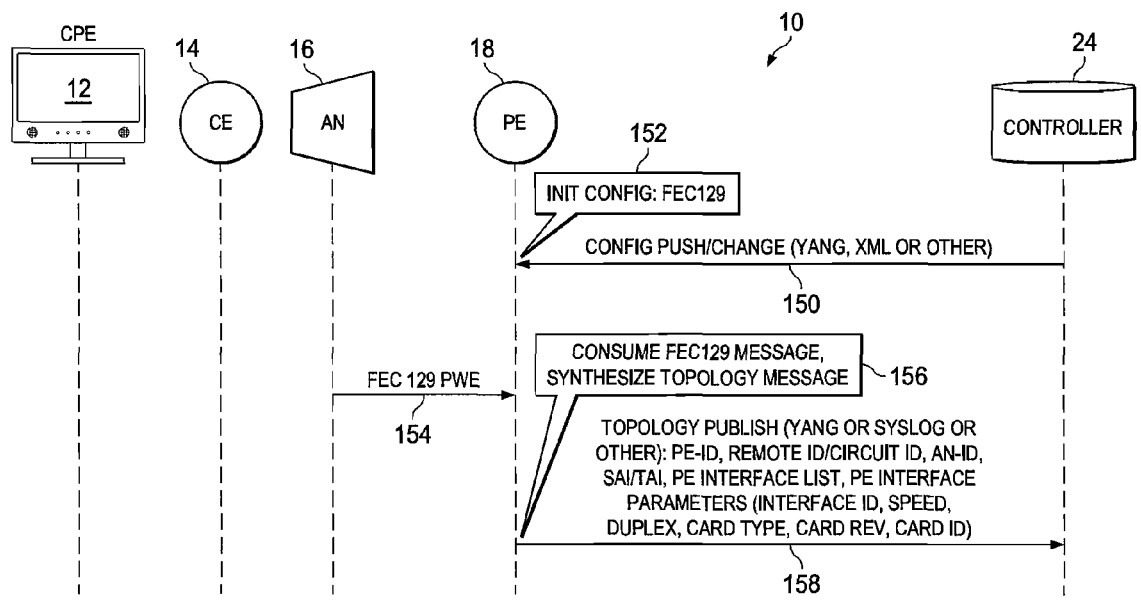
FIG. 9 is a simplified sequence diagram illustrating yet other example details of the communication system in accordance with one embodiment.

Turning to FIG. 9, FIG. 9 is a simplified sequence diagram illustrating example details and potential operations of another embodiment of communication system 10 associated with call flow provisioning for PWE UNI. PE 18 may provide services on an MPLS tagged interface. Communication system 10 can include CPE 12, CE 14, AN 16, PE 18 and Controller 24. At 150, controller 24 may push configurations on PE 18 using appropriate Yang data model, XML, or other suitable mechanisms. At 152, PE 18 may be initially configured for Forwarding Equivalence Class (FEC) 129 (FEC is a group of packets which are forwarded in the same manner, over the same path, and with the same forwarding treatment). At 154, a FEC 129 pseudowire (PWE) message may be sent by AN 16 to PE 18. At 156, collection and publication agent 20 at PE 18 may consume the FEC 129 message and synthesize appropriate topology message 22. At 158, PE 18 may publish topology message 22 to controller 24. Topology message 22 may include, by way of examples and not limitations, PE-ID, Remote ID/Circuit ID, AN-ID, SAI/TAI, PE Interface list, and PE Interface parameters (e.g., Interface ID, Speed, Duplex, Card Type, Card Rev, Card ID).

Figure 10:
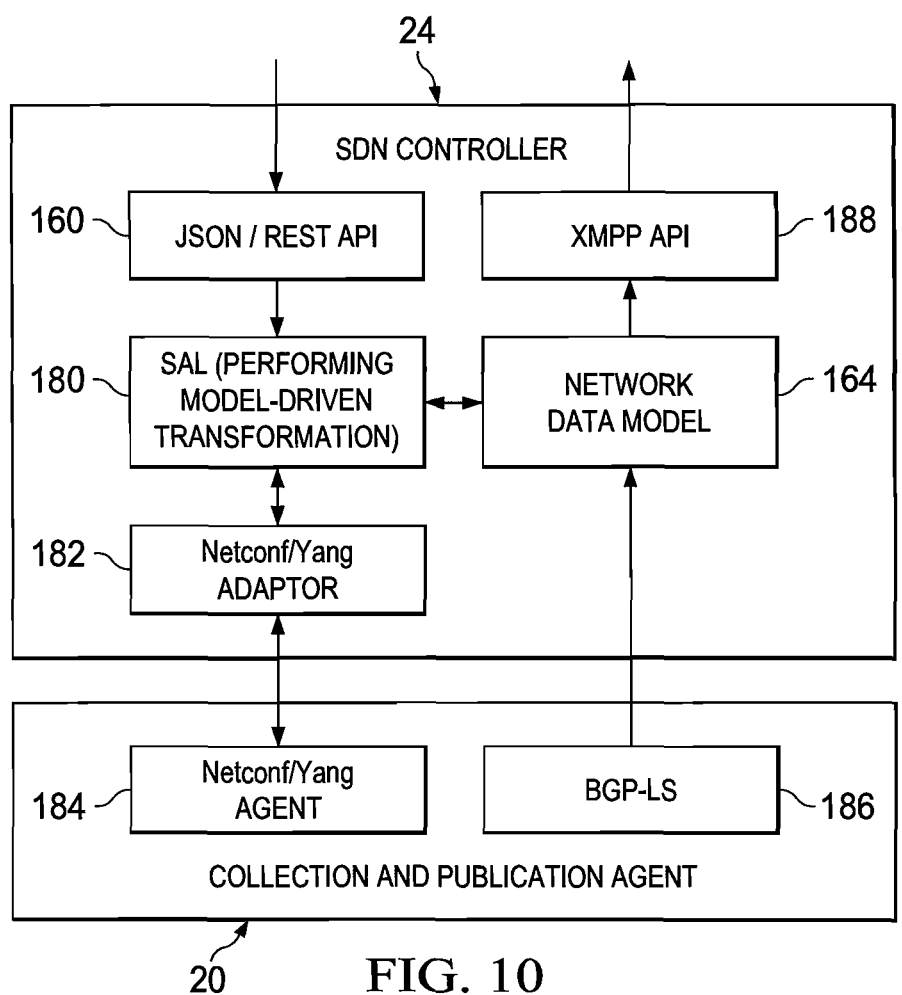
FIG. 10 is a simplified block diagram illustrating example details of the communication system in accordance with one embodiment.

Turning to FIG. 10, FIG. 10 is a simplified block diagram illustrating other example publishing agent modules according to an embodiment of communication system 10. SDN controller 24 may include JSON/REST API 160, a SAL 180 (e.g., for performing model-driven transformation), network data model 164, and a Netconf/YANG adaptor 182. Netconf/YANG adaptor 182 may push configuration settings to a corresponding Netconf/YANG agent 184 in collection and publication agent 20; and may receive topology message 22 from BGP-LS module 186. An XMPP API 188 may also be available in ONE controller 24.

Figure 11:
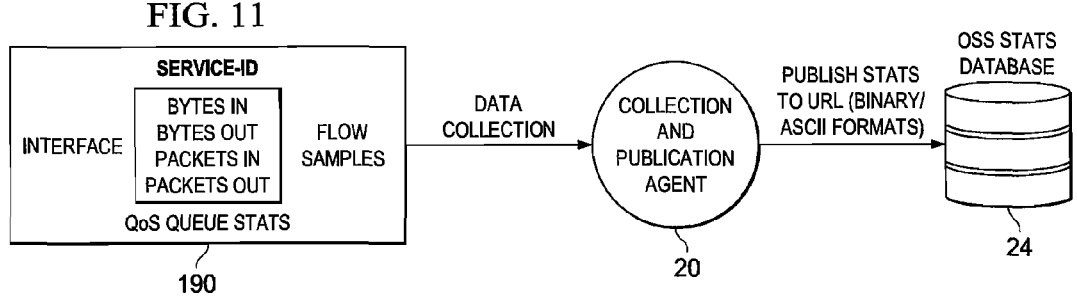
FIG. 11 is a simplified block diagram illustrating yet other example details of the communication system in accordance with one embodiment.

Turning to FIG. 11, FIG. 11 is a simplified block diagram illustrating example details of data collection according to an embodiment of communication system 10. Flow statistics associated with a service ID 190 (e.g., bytes in, bytes out, QoS queue statistics, etc.) may be received at collection and publication agent 20. Collection and publication agent 20 may publish the statistics and other data to a specific URL in binary or ASCII formats to a OSS stats database in controller 24 in some embodiments.

Figure 12:
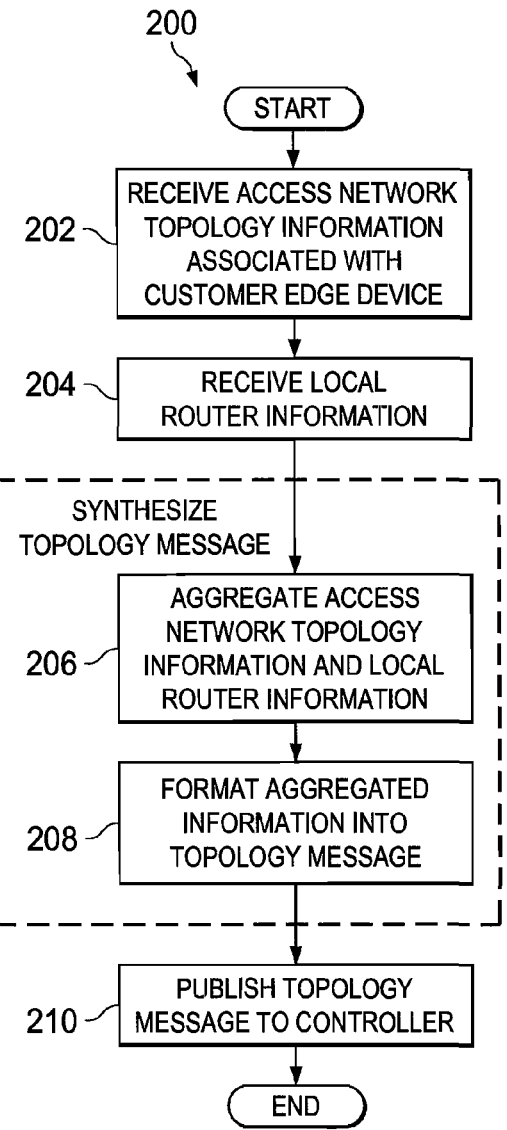
FIG. 12 is a simplified flow diagram illustrating potential example operations that may be associated with an embodiment the communication system.

Turning to FIG. 12, FIG. 12 is a simplified flow diagram illustrating example operations 200 that may be associated with collection and publication agent 20 according to an embodiment of communication system 10. At 202, collection and publication agent 20 at PE 18 may receive access network topology information associated with CE 14. At 204, collection and publication agent 20 at PE 18 may receive local router information associated with PE 18. At 206, collection and publication agent 20 at PE 18 may aggregate access network topology information and local router information. At 208, collection and publication agent 20 at PE 18 may format the aggregated information into topology message 22. Operations 206 and 208 may comprise synthesizing topology message 22 in some embodiments. At 210, collection and publication agent 20 at PE 18 may publish topology message 22 to controller 24.

Figure 13:
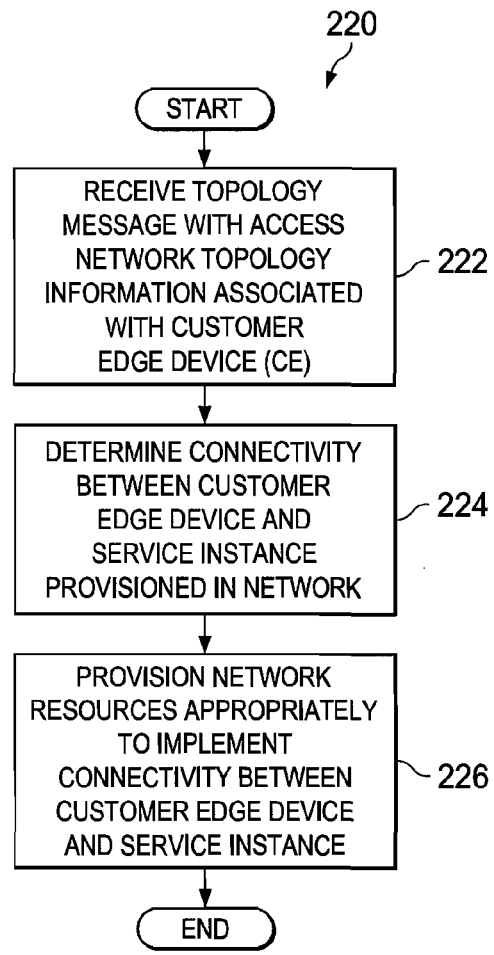
FIG. 13 is a simplified flow diagram illustrating other potential example operations that may be associated with an embodiment the communication system.

Turning to FIG. 13, FIG. 13 is a simplified flow diagram illustrating example operations 220 that may be associated with controller 24 according to an embodiment of communication system 10. At 222, collection and publication agent 20 at PE 18 may receive topology message 22 with access network topology information associated with a specific CE 14. At 224, controller 24 may determine connectivity between CE 14 and a requested service instance provisioned at PE 18. At 226, controller 24 may appropriately provision network resources to implement connectivity between CE 14 and the service instance.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, collection and publication agent 20. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, collection and publication agent 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving, at a provider edge device (PE), access network topology information associated with a customer edge device (CE) in a network environment, the CE in communication with the PE over the network through one or more intermediate access nodes (ANs);
    synthesizing the access network topology information and a local router information, including hardware inventory associated with the PE into a topology message, the hardware inventory indicative of device information including information about types and versions of line cards in the PE, software and firmware revisions, and transceiver types of the PE; and
    publishing the topology message to a central controller in the network environment.

2. The method of claim 1, wherein the synthesizing comprises aggregating the access network topology information and the local router information, modeling the aggregated information in a representation-independent format and encoding the representation-independent formatted aggregated information in standardized machine-parsable format.

3. The method of claim 1, wherein the access network topology information is received according to an access node (AN) protocol from an AN, and wherein the AN protocol executes out-of-band to user traffic and identifies a Circuit identifier (ID), a Remote ID of the CE and a virtual local area network (VLAN) stack over which user traffic can be communicated with the AN.

4. The method of claim 3, wherein the AN protocol is Access Node Control Protocol (ANCP).

5. The method of claim 1, wherein the access network topology information is received according to a customer premises equipment (CPE) protocol, wherein the CPE protocol executes in-band with user traffic mapped to a port and a VLAN at the PE, wherein the CE identifies itself to the PE, wherein the CE is trusted by the PE.

6. The method of claim 5, wherein the CPE protocol is Extensible Messaging and Presence Protocol (XMPP).

7. The method of claim 5, wherein the CPE protocol is intercepted and modified by an AN to include addition of at least a Circuit ID and a Remote ID.

8. The method of claim 7, wherein the CPE protocol is Dynamic Host Configuration Protocol (DHCP).

9. The method of claim 1, wherein the access network topology information is received at the PE according to a CPE user datagram based protocol in a First-Sign-Of-Life (FSoL) packet.

10. The method of claim 1, wherein the access network topology information is received at the PE from a PE port.

11. The method of claim 1, wherein the access network topology information is received at the PE in a Forwarding Equivalence Class (FEC) 129 pseudowire (PWE) message.

12. One or more non-transitory tangible media encoding logic that includes instructions for execution that when executed by a processor, is operable to perform operations comprising:
   receiving, at a PE, access network topology information associated with a CE in a network environment, the CE in communication with the PE over the network through one or more intermediate access nodes (ANs);
   synthesizing the access network topology information and a local router information, including hardware inventory associated with the PE into a topology message, the hardware inventory indicative of device information including information about types and versions of line cards in the PE, software and firmware revisions, and transceiver types of the PE; and
   publishing the topology message to a central controller in the network environment.

13. The media of claim 12, wherein the access network topology information is received according to an AN protocol from an AN, and wherein the AN protocol executes out-of-band to user traffic and identifies a Circuit ID, a Remote ID of the CE and a VLAN stack over which user traffic can be communicated with the AN.

14. The media of claim 12, wherein the access network topology information is received according to a CPE protocol, wherein the protocol executes in-band with user traffic mapped to a port and a VLAN at the PE, wherein the CE identifies itself to the PE, wherein the CE is trusted by the PE.

15. The media of claim 14, wherein the CPE protocol is intercepted and modified by an AN to include addition of at least a Circuit ID and a Remote ID.

16. The media of claim 12, wherein the access network topology information is received at the PE according to a CPE user datagram based protocol in a FSoL packet.

17. An apparatus, comprising:
   a collection and publication agent;
   a memory element for storing data; and
   a processor that executes instructions associated with the data, wherein the processor and the memory element cooperate such that the apparatus is configured for:
      receiving, at a PE, access network topology information associated with a CE in a network environment, the CE in communication with the PE over the network through one or more intermediate access nodes (ANs);
      synthesizing the access network topology information and a local router information, including hardware inventory associated with the PE into a topology message, the hardware inventory indicative of device information including information about types and versions of line cards in the PE, software and firmware revisions, and transceiver types of the PE; and
      publishing the topology message to a central controller in the network environment.

18. The apparatus of claim 17, wherein the access network topology information is received according to an AN protocol from an AN, and wherein the AN protocol executes out-of-band to user traffic and identifies a Circuit ID, a Remote ID of the CE and a VLAN stack over which user traffic can be communicated with the AN.

19. The apparatus of claim 17, wherein the access network topology information is received according to a CPE protocol, wherein the protocol executes in-band with user traffic mapped to a port and a VLAN at the PE, wherein the CE identifies itself to the PE, wherein the CE is trusted by the PE.

20. The apparatus of claim 17, wherein the CPE protocol is intercepted and modified by an AN to include addition of at least a Circuit ID and a Remote ID.

\* \* \* \* \*